United States Patent
Bruestle et al.

(10) Patent No.: US 7,474,448 B2
(45) Date of Patent: Jan. 6, 2009

(54) FOCUSING A LASER BEAM

(75) Inventors: Reiner Bruestle, Lauterbach (DE); Andreas Voss, Stuttgart (DE); Martin Huonker, Zimmern (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 12/028,105

(22) Filed: Feb. 8, 2008

(65) Prior Publication Data

US 2008/0165405 A1   Jul. 10, 2008

Related U.S. Application Data

(62) Division of application No. 11/240,658, filed on Sep. 29, 2005, now Pat. No. 7,339,750.

(30) Foreign Application Priority Data

Sep. 30, 2004   (EP) .................................. 04023319

(51) Int. Cl.
G02B 26/08 (2006.01)
(52) U.S. Cl. ...................... 359/201; 359/202; 359/210; 359/823
(58) Field of Classification Search ................. None
See application file for complete search history.

(56) References Cited

U.S. PATENT DOCUMENTS

| | | | |
|---|---|---|---|
| 4,629,859 A | 12/1986 | Reddy | |
| 4,666,262 A | 5/1987 | Zobel | |
| 5,257,125 A * | 10/1993 | Maeda | 359/196 |
| 6,034,804 A * | 3/2000 | Bashkansky et al. | 359/201 |
| 6,059,721 A | 5/2000 | Rudischhauser et al. | |
| 6,137,632 A | 10/2000 | Bernacki | |
| 6,243,189 B1 * | 6/2001 | Ribes et al. | 359/201 |

FOREIGN PATENT DOCUMENTS

| | | |
|---|---|---|
| EP | 0 723 834 | 7/1996 |
| EP | 0 877 273 | 11/1998 |
| FR | 2603709 | 3/1988 |
| JP | 05002146 | 1/1993 |
| JP | 07116869 | 5/1995 |
| JP | 2000197984 | 7/2000 |
| JP | 2003-012346 | 1/2003 |

\* cited by examiner

*Primary Examiner*—James Phan
(74) *Attorney, Agent, or Firm*—Fish & Richardson P.C.

(57) ABSTRACT

A device for focusing a laser beam includes a first telescopic configuration and a second telescopic configuration. The first telescopic configuration includes a collimating optical element for collimating the laser beam and a downstream focusing optical element for focusing the laser beam onto a focal point. The second telescopic configuration includes a first lens and a downstream second lens disposed in the divergent beam path upstream of the first telescopic configuration. The first and second lenses of the second telescopic configuration are moveable relative to each other in the beam direction.

9 Claims, 3 Drawing Sheets

FOCUSING A LASER BEAM

CROSS REFERENCE TO RELATED APPLICATIONS

This application is a divisional of U.S. application Ser. No. 11/240,658, filed Sep. 29, 2005, now, U.S. Pat. No. 7,339,750, which claims priority under 35 U.S.C. §119(a) to European Patent Application No. 04 023 319.9, filed Sep. 30, 2004, the entire contents of which are hereby incorporated by reference.

TECHNICAL FIELD

The application relates to a device for focusing a laser beam.

BACKGROUND

A conventional scanner processing head for fast spatial processing of workpieces using laser beams consists of scanner optics usually including two mirrors that deflect a collimated or almost collimated beam in a first and a second spatial direction and guide it onto the workpiece using a plane field objective. In an alternative system, downstream of the focusing lens, a focused beam is guided by at least one scanner mirror onto the workpiece. For processing three-dimensional objects using such a scanner optics, the position of the focal point of the laser radiation in the beam direction must additionally be adjustable. This necessitates a device for focusing the laser beam that permits displacement of the focal position in the beam direction.

If the laser connected to the scanner optics is a solid-state laser, the output laser beam is preferably transmitted to the scanner optics through an optical fiber (laser light guide). In the scanner optics, the laser beam emerges from the laser light guide in a diverging manner, is collimated using a collimation lens, is subsequently deflected by the scanner mirrors and is focused onto the workpiece using a plane field objective. To adjust the focus along the beam axis, the divergence of the beam impinging on the focusing objective is changed by, for example, moving the collimation lens along the beam axis.

One disadvantage of this approach is that the collimating lens is relatively large and therefore heavy, and the displacement of the lens must be relatively large to obtain a noticeable focus shift of the working beam. With this approach, the usually required high dynamics of the shifting motion involves a very high driving power, requiring a large and heavy construction (with even increased moving mass) and complex control and cooling of the actuators. Moreover, the large and highly accelerated mass exerts a considerable reaction force on the static part of the assembly, which may cause undesired motion or oscillations of the beam guiding system (which is mounted for example, to a robot arm) that can be compensated for or minimized only with considerable additional expense.

The documents JP05002146, JP2000197984, JP07116869 and JP2003012346 moreover disclose the use of a telescope system having two lenses that may have different sizes, to influence the divergence of the beam. One of the two lenses is displaced. Typically, the smaller lens that can be displaced with less force to change the separation between the two lenses is the lens that is displaced. These lenses are situated in the collimated beam and not in the divergent beam.

SUMMARY

A device is described for focusing a laser beam and the device permits displacement of the focal position in the beam direction. Using this device, the focal point can be rapidly positioned in the beam direction, thereby preventing, in particular, undesired oscillations of the device.

In some aspects, the device includes a second telescopic configuration including a first lens and a downstream second lens, in the divergent beam path upstream of a first telescopic configuration. The first telescopic configuration includes a collimating optical element and a downstream focusing optical element that focuses the collimated laser beam on a focal point. The first lens and/or the second lens of the second telescopic configuration can be displaced relative to each other in the beam direction. Due to the position of the second telescopic configuration in the divergent beam path upstream of the first telescopic configuration, the lenses used for the second telescopic configuration may have a smaller focal length than the optical elements of the first telescopic configuration. The lens displacement required to adjust the focus along the beam axis is therefore reduced in a ratio of the focal lengths.

In one implementation, the lens diameters of the second telescopic configuration are smaller than the diameters of the optical elements of the first telescopic configuration. The optical elements of the first telescopic configuration may be, for example, lenses or mirrors. The lenses of the second telescopic configuration are positioned in the divergent laser beam in such a manner that these lenses may have only a small diameter and therefore little mass, permitting highly dynamic motion thereof. The telescopic lenses should basically have a minimum size to optimize their dynamic properties.

In a further implementation, the first lens and the second lens of the second telescopic configuration each have approximately the same absolute value of focal length. In this case, motion of both lenses in the same direction (caused by external forces) only has a very small influence on the focal position.

In one implementation, the second telescopic configuration is disposed in the vicinity of the exit plane of a laser light guide. It is thereby possible to use lenses with particularly small diameters in the second telescopic configuration.

In one implementation, the separation between the first lens and the second lens of the second telescopic configuration is substantially equal to the sum of the absolute values of their focal lengths. The lens separation is preferably selected in such a manner that the magnification of the laser light guide exit plane on the workpiece remains largely constant when the lenses are displaced. To meet these requirements, the optimum lens separation is approximately the sum of the focal lengths of the lenses.

In a further implementation, the first lens and the second lens of the second telescopic configuration are designed as convergent lenses. In this case, the telescopic configuration is designed as Keplerian telescope. This configuration can prevent collision between the beam path and a compact coaxial drive for displacing the lenses. In the Keplerian telescope, an intermediate focus forms after the second lens such that the diameter of the beam at an axial distance of approximately two focal lengths downstream of the second lens does not exceed the lens diameter. The second drive with correspondingly small bore diameter can be disposed in this region. Furthermore, the optimum lens separation is approximately the sum of the focal lengths. The sum of focal lengths, which is relatively large for a Keplerian telescope, provides additional space for the drives.

In an alternative implementation, the first lens of the second telescopic configuration is designed as convergent lens and the second lens is designed as dispersive lens. The telescopic configuration is a Galilean telescope in this case, and the separation between the first and second lenses may be chosen to be very small.

In a further implementation, the first lens and the second lens of the second telescopic configuration are moveable in the beam direction in opposite directions by approximately identical path lengths. The divergence of the beam can thereby be changed in a particularly advantageous manner. The lens displacement required to adjust the focus along the beam axis is divided to two lenses, thereby halving the required lens displacement for each of the two lenses, which considerably increases the dynamics of the lens motion. Since the motion of the lenses is symmetrically opposite, it is moreover ensured that only small reaction forces act on the mounting of the focusing device.

In another implementation, the first lens and/or the second lens of the second telescopic configuration is/are disposed in a bearing, which includes at least one annular membrane spring whose inner diameter corresponds substantially to the lens diameter. The membrane spring includes, in particular, a plurality of azimuthal slots.

The bearing may include two membrane springs that are spaced apart from each other in the beam direction and are connected to each other in the region of the inner diameter by a tube extending parallel to the beam direction. The large radial stiffness of the individual membrane thereby provides the composite with a high dumping resistance (principle of parallelogram bearing).

In another general aspect, a scanner processing head for three-dimensional workpiece processing includes the above-described device for focusing the laser beam. The position of the focal point can be adjusted in a first and second spatial direction with scanner optics, for example, with one single mirror or with two mirrors, and in a third spatial direction through changing the focal position using the device. With such a scanner, the workpiece can be laser-processed in all three spatial directions with approximately the same speed.

In another general aspect, a method of focusing a divergent laser beam exiting from the exit plane of a laser light guide onto a workpiece includes directing the laser beam through the first lens, directing the beam from the first lens through the second lens, collimating the beam from the second lens with the collimating optical element, and focusing the beam from the collimating optical element at the focal point using the focusing optical element. The method also includes establishing a standard distance between the first and second lenses such that the magnification of the exit plane of the laser light guide onto the workpiece remains substantially constant when the lenses are displaced in opposite directions along the beam direction in order to move the focal point along the beam direction.

The use of the device for focusing a laser beam is, however, not limited to the application in a scanner processing head. It may be used, for example, for deep welding processes to integrate an inventive telescopic configuration in a processing head without scanner optics for rapid adjustment of the focal position in the beam axis.

Further advantages can be extracted from the description and the drawings. The features mentioned above and below may be used either individually or collectively in arbitrary combination. The implementations shown and described are not to be understood as exhaustive enumeration but have exemplary character for describing the device. Other features will be apparent from the description, the drawings, and the claims.

DESCRIPTION OF DRAWINGS

Like reference symbols in the various drawings may indicate like elements.

DETAILED DESCRIPTION

Figures 1A, 1B, 1C:
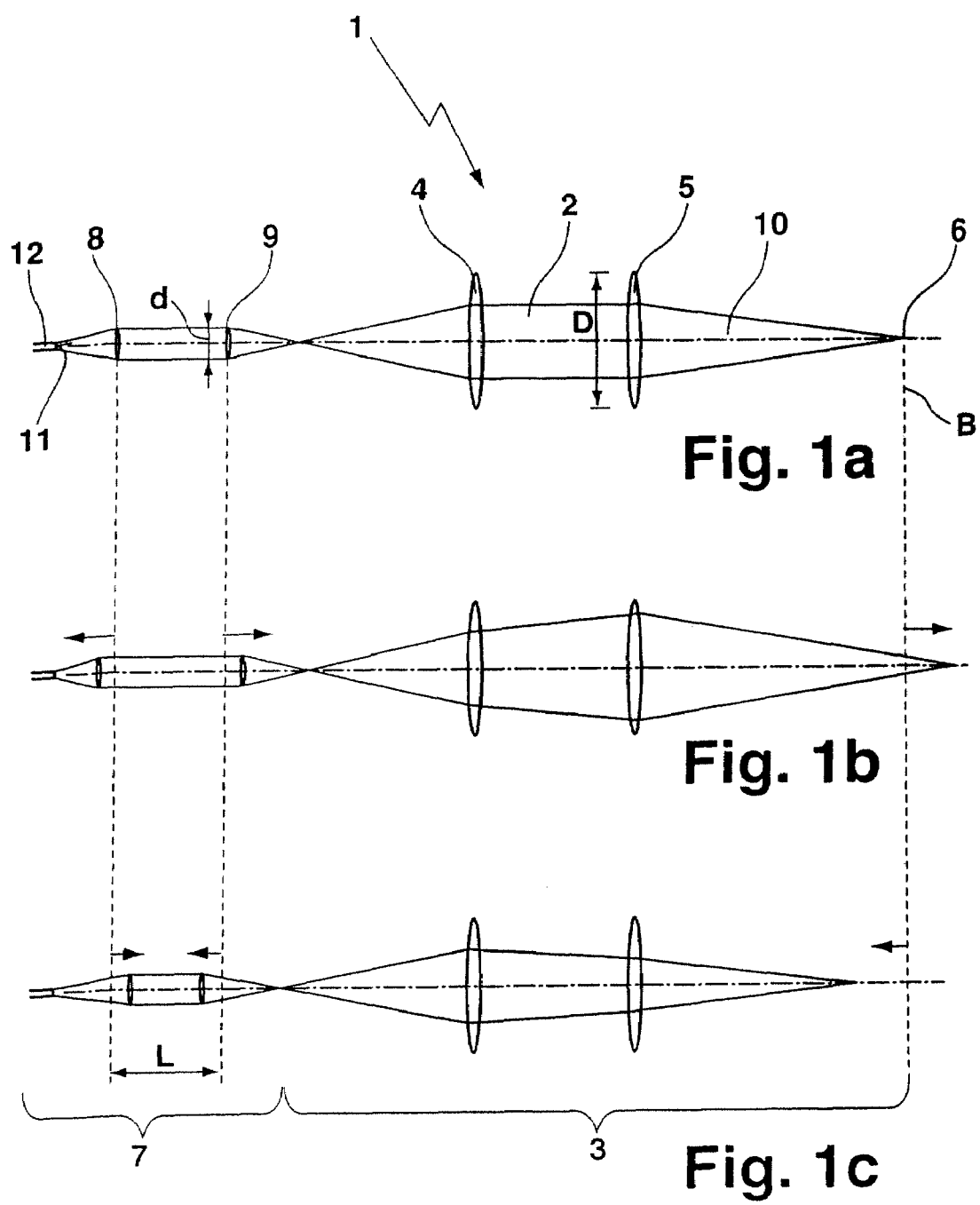
FIGS. 1a-1c show three partial views a, b, c of a device including first and second telescopic configurations for focusing a laser beam to three different focal points.

Referring to FIG. 1a, a device 1 is used for focusing a laser beam 2 that defines a beam direction 10. The device 1 serves to change a focal point of the laser beam 2 on a workpiece (not shown). The device 1 includes a first telescopic configuration 3 including a collimating lens 4 and a focusing lens 5 (diameter D) for focusing the laser beam 2 onto a focal point 6. The device 1 includes a second telescopic configuration 7 with a first lens 8 and a downstream second lens 9 (diameter d<D) that are disposed in the beam path upstream of the first telescopic configuration 3. The first lens 8 and the second lens 9 of the second telescopic configuration 7 can be displaced relative to each other in the beam direction 10. The second telescopic configuration 7 is disposed in the vicinity of an exit plane 11 of a laser light guide 12. The second telescopic configuration 7 is designed as a Keplerian telescope since the first lens 8 and the second lens 9 of the second telescopic configuration 7 are collimating lenses. Both lenses 8, 9 have the same construction and therefore the same focal lengths. Altogether, one obtains an optimum focal length range of approximately 20-60 mm for the lenses 8, 9 of the Keplerian telescope for the high-performance range of a laser.

In another implementation, the second telescopic configuration 7 is designed as a Galilean telescope. In such a configuration, the focal length range tends to be slightly higher.

The function of the device 1 is exemplarily shown in the partial views shown in FIGS. 1a through 1c. FIG. 1a shows the device 1 in the state of rest. The first lens 8 and the second lens 9 of the second telescopic configuration 7 are disposed at a separation L from each other. The separation L is substantially the sum of the absolute values of focal lengths of the first and second lenses 8, 9. In this state of rest, the focal point 6 of the laser beam 2 is in plane B.

In FIG. 1b, the first lens 8 and the second lens 9 are moved apart from each other in opposite directions along approximately identical path lengths. In this state, the focal point 6 is displaced from the plane B in the beam path behind plane B.

In FIG. 1c, the first lens 8 and the second lens 9 are moved towards each other along approximately identical displacement path lengths. In this state, the focal point 6 is displaced from the plane B in the beam path in front of plane B.

The separation L in the rest position is selected such that the magnification of the exit plane of the laser light guide onto the workpiece remains substantially constant. The minimum variation in scale that can be achieved depends on the selected optical configuration (for example, the type and size of the telescopic configuration 3 or 7, length of the collimated beam, etc.) and on the required displacement of the focal position relative to the focal length of the focusing optical element of the first telescopic configuration 3. A variation of a small percentage of the image is maximally allowable without compensation (for example, adjustment of the processing speed or laser power) depending on the application.

The diameters d of the first 8 and second lenses 9 of the second telescopic configuration 7 should be as small as possible to improve the dynamic properties of the device 1. Small lens apertures resulting from short focal lengths increase the risk of overheating mounts and beam guiding elements (covers, apertures, etc.). In this case, active cooling may be required. Depending on the shape of the optical fiber connector or the socket, one obtains a minimum working separation (and therefore a minimum focal length) for the first lens 8 from the exit plane 11 of the laser light guide 12.

Figure 2:
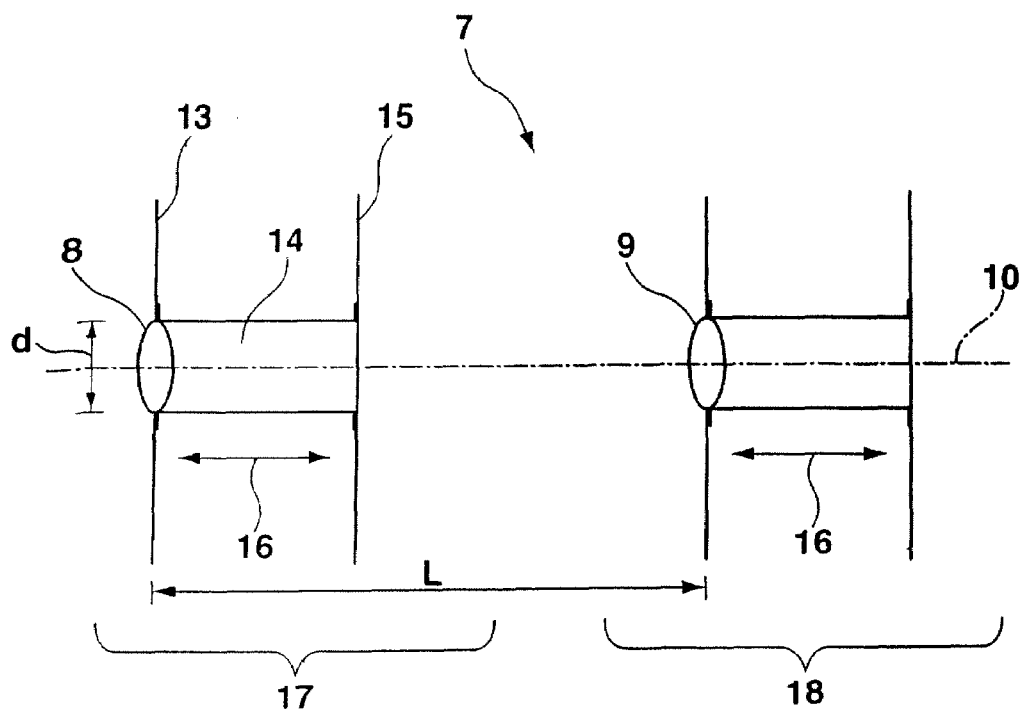
FIG. 2 shows a highly schematized longitudinal section of the second telescopic configuration of FIG. 1 with two bearings each including two annular membrane springs.

Referring to FIG. 2, a bearing of the second telescopic configuration 7 is shown for supporting the first and second lenses 8, 9. A first bearing unit 17 bears the first lens 8. The first bearing unit 17 includes an annular membrane spring 13 in which the first lens 8 is disposed, a further member spring, and a pipe 14. The inner diameter of the spring 13 is adjusted to the diameter d of the lens 8. The membrane spring 13 is connected to the further membrane spring 15 through the pipe 14. The pipe 14 is connected to a linear drive (not shown) for displacing (double arrow 16) the first lens 8 in the beam direction 10. The linear drive can be designed as a plunger drive and disposed in the beam propagating direction 10 behind the second membrane spring 15 coaxially to the laser beam.

The second telescopic configuration 7 includes a second bearing unit 18 for bearing the second lens 9. Because the second lens 9 has the same construction as the first lens 8, the second bearing unit 18 can have the same construction as the first bearing unit 17. The overall length of the linear drives of the Keplerian telescope should maximally be approximately four times the focal length.

Figure 3:
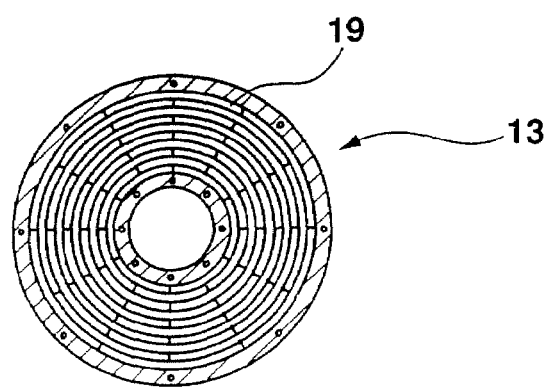
FIG. 3 shows a top view of one of the annular membrane springs of FIG. 2 with azimuthal slots.

FIG. 3 shows a top view of the membrane spring 13 of the second telescopic configuration 7. The membrane spring 13 preferably is made of stainless steel, hardened spring steel, or phosphorus bronze, and has a very small stiffness in the axial direction, which has an advantageous effect on the dynamics of the motion and on the required driving power. The membrane spring 13 is extremely rigid in the radial and azimuthal directions such that a lens can move only in an axial direction but cannot be twisted or be laterally displaced. The membrane spring 13 comprises a number of azimuthal slots 19 that can be produced for example, through laser cutting and that strongly reduce the axial stiffness of the membrane spring 13 but still keep a high radial stiffness.

Figure 4:
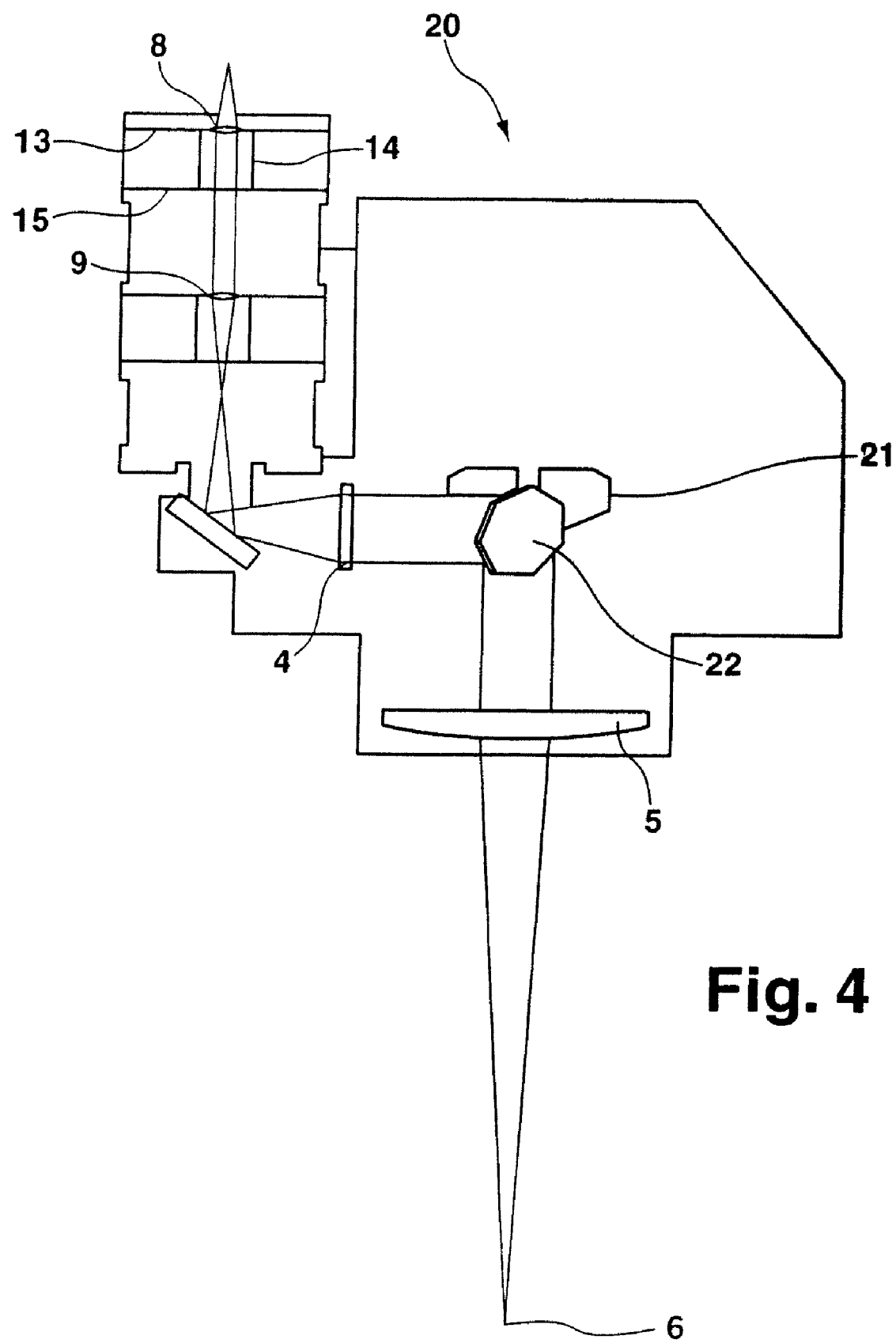
FIG. 4 shows a scanner processing head for three-dimensional material processing with an inventive focusing device in accordance with FIG. 2.

Referring to FIG. 4, the device 1 for focusing a laser beam 2 can be utilized with particular preference in a scanner processing head 20 for three-dimensional workpiece processing. The position of the focal point 6 can thereby be adjusted in a first and second spatial direction with two scanner mirrors 21, 22 and in a third spatial direction through changing the focal position using the device 1. The workpiece can thereby be processed in three dimensions, wherein the short lens shift and the low mass of the lenses 8, 9 of the device 1 also ensure processing in the third spatial direction at a sufficiently high speed, since the focal point 6 can be quickly adjusted. The bearing with the membrane springs 13, 15 moreover ensures precise setting of the focal position in the third spatial direction. The focal position can be adjusted in a controlled manner by measuring the deflection of the lenses.

Other implementations are within the scope of the following claims.

What is claimed is:

1. A scanner processing head for processing a three-dimensional workpiece, the scanner processing head comprising:
   a device for focusing a laser beam, the device comprising:
      a first telescopic configuration including a collimating optical element that collimates a laser beam, and a downstream focusing optical element that focuses the laser beam on a focal point; and
      a second telescopic configuration including a first lens and a downstream second lens moveable relative to each other, the second telescopic configuration being disposed in a divergent beam path upstream of the first telescoping configuration; and
   two scanner mirrors operable to adjust a position of the focal point in a first and second spatial direction;
   wherein the device is operable to adjust a position of the focal point in a third spatial direction.

2. The scanner processing head of claim 1, wherein diameters of the first lens and the second lens of the second telescopic configuration are smaller than diameters of the collimating optical elements of the first telescopic configuration.

3. The scanner processing head of claim 1, wherein the first lens and the second lens of the second telescopic configuration each have approximately the same absolute value of focal length.

4. The scanner processing head of claim 1, wherein the second telescopic configuration is disposed in the vicinity of an exit plane of a laser light guide.

5. The scanner processing head of claim 1, wherein a separation between the first lens and the second lens of the second telescopic configuration is substantially equal to the sum of the absolute values of their focal lengths.

6. The scanner processing head of claim 1, wherein the first lens and the second lens of the second telescopic configuration are convergent lenses.

7. The scanner processing head of claim 1, wherein the first lens of the second telescopic configuration is a convergent lens and the second lens is a dispersive lens.

8. The scanner processing head of claim 1, wherein the first lens and the second lens of the second telescopic configuration are moveable in opposite directions along the beam by approximately identical path lengths.

9. The scanner processing head of claim 1, wherein at least one of the first lens and the second lens of the second telescopic configuration is disposed in a bearing that comprises at least one annular membrane spring having an inner diameter that corresponds substantially to a diameter of the at least one first or second lens.

* * * * *